United States Patent [19]
Sharan

[11] Patent Number: 6,021,862
[45] Date of Patent: Feb. 8, 2000

[54] SOLAR ENERGY POWERED ELECTRIC VEHICLE

[76] Inventor: Anand M. Sharan, 67 Ennis Avenue, St. John's, Canada, A1A 1Y7

[21] Appl. No.: 08/842,362

[22] Filed: Apr. 24, 1997

[51] Int. Cl.[7] .................................................. B62D 61/06
[52] U.S. Cl. ............................................ 180/216; 180/217
[58] Field of Search ............................ 180/2.2, 219, 211, 180/215, 216, 217; 280/62; 136/243–246, 251, 259; 188/156–159; 318/362, 373, 375, 376, 379, 380

[56] References Cited

U.S. PATENT DOCUMENTS

| | | | |
|---|---|---|---|
| 4,200,163 | 4/1980 | Bass | 180/219 |
| 5,132,598 | 7/1992 | Albanesius | 318/285 |
| 5,277,268 | 1/1994 | Kuwayama | 180/216 |
| 5,343,973 | 9/1994 | Lanker | 180/211 |

*Primary Examiner*—Lee W. Young
*Assistant Examiner*—C. J. Bartz

[57] ABSTRACT

A tricycle is driven by an electric motor supplied by batteries recharged by solar panels. Electric braking is used. The batteries and a battery charger are enclosed in a thermally insulated compartment and the batteries are kept warm in cold weather by the heat produced by the battery charger and by electric braking. The solar panels are mounted on the roof of the passenger cabin and/or on the insulated compartment and are oriented towards the sun by a stepper motor.

30 Claims, 25 Drawing Sheets

SOLAR ENERGY POWERED ELECTRIC VEHICLE

BACKGROUND OF THE INVENTION

1. Field of Invention

This invention relates, in general, to electric powered vehicles, and more specifically, to electric powered vehicles which utilize the solar energy to generate the energy required for propulsion and other uses such as powering a transistorized radio or a audio cassette recorder, etcetera.

2. Description of the Prior Art

With the decline in the fossil fuel reserves and increasing industrialization of majority of the countries throughout the world, the use of alternate sources of energy has become an urgent task. Secondly, many countries are facing traffic jams in their urban areas which have devastating effects on the health of the drivers of fossil fuel powered vehicles and also, those of the residents of those areas. This has lead to the search for the electricity powered vehicles which would not emit pollutants. The pollution problem is very severe in many of the under-developed countries where a large number of two cylinder vehicles such as scooters, three-wheelers, and motor-cycles are used in large numbers. Many of these two cylinder engines burn lubricating oil, in addition to gasoline, resulting in many of the respiratory diseases.

In electric powered engines, the motion is provided using electric motors and speed reduction is done using a train of sprockets connected by chains, or by a gear train. The energy loss in such transmissions is minimal. The efficiency of the electric motor driven system is far more than those of any, driven by the internal combustion engines.

The energy stored in a fossil fuel per unit volume is far greater than that of the corresponding volume of batteries which store electrical energy. Considering the specific weights (considering the weight as the criteria for energy or fuel consumption) of these two types of storages, the energy stored in a gasoline tank is far in excess of those of the batteries. This has been the primary reason the fossil fuel powered vehicles are in use today even though, efficiency-wise, they are far less energy efficient. A number of these vehicles are not weight optimized based on the number of passengers they carry, including speed considerations.

In summary, the fossil fuel based vehicles are undesirable because of several reasons: The first one is that they are heavy therefore energy inefficient. The second is that the world fuel supply is limited and declining . The third is that many countries do not have these fuel reserves and are short of hard currency to purchase the fuel in the international markets. Finally, these vehicles are polluting, and the time has come that people have become aware of the diseases caused by pollutants emitted by these vehicles.

In the design of electric vehicles which are available to-day, attempts have been made to reduce the weight of the structure to some extent but in many cases, the existing body remains as it used to be. Thus, such vehicles need large number of batteries (high energy storage), which (the batteries) by themselves are quite heavy to power such vehicles. If we look at the combined weight of the vehicle and the batteries, there is not much progress, as far as the reduction in weight is concerned. This has resulted in not much improvement in the energy efficiency.

One of the problems with the batteries is that their charge holding capacity goes down very significantly as the temperature decreases say from 20° C. (centigrade) to the freezing point of water (0° C.). Thus, these electric vehicles have very limited range (driving distance between two charges).

Thirdly, in many under-developed countries the supply of electricity in different areas is not continuous; there are frequent power break-downs or there are planned shut downs (rationing). In such places, the design of the electric vehicles has to be based on reduced dependence on city supply but increased utilization of other means of charging the batteries, which can be due to the use of solar energy.

The use of solar energy is also very important in countries such as USA or Canada because, by varying the ratio of the solar energy to that of the city supplied electrical energy, one can increase the driving distance (the range) before the batteries need to be re-charged.

As stated before, by minimizing the weight of the structure, one can increase the range of the vehicle before it needs re-charging. Since there is approximately a maximum of 800 Watts per square metre of solar energy available anywhere in the world, if those vehicles whose weights, including the passengers weights, are such that the energy available after conversion (conversion efficiency of approximately 13% for photovoltaic panels) of the above mentioned energy (800 Watts/meter$^2$) over a whole day is significant part of the daily energy consumption then, one can easily meet the objectives of non pollution and fossil fuel conservation. In many areas of the world, especially in smaller cities, the solar energy available in the electrical form (after conversion), can be sufficient. In other places, a combination of city supplied electrical energy and the solar energy will take care of the energy needs. In this way, one can avoid the combustion of fossil fuels in the vehicles used for transportation.

BRIEF SUMMARY OF THE INVENTION

It is disclosed here, an unique solar powered vehicle which can be powered in two ways: The first way is by using the solar energy and the second-from the regular supply of electricity. The solar radiation is converted into electric energy using photovoltaic panels. This electrical energy is used to charge a bank of batteries. The electric motor (can be a direct current motor) derives its energy from the batteries. The electric motor provides the motion to the vehicle through either a set of sprockets and chains or, through a gear train, which includes differential drives for the rear wheels.

The braking is achieved using disk brakes where the pressure is applied hydraulically using master cylinders. In addition, the braking can also be applied electrically using any of the three methods. These are: (a) regenerative braking (b) plugging, and (c) dynamic braking. In the last two, resistors are used to dissipate the kinetic energy into heat when the vehicle is in motion. The advantage of the regenerative concept is that a part of the kinetic energy is regenerated into electrical energy in the batteries. This would be quite useful in city driving where one has to apply brakes quite frequently. Depending upon the regenerative efficiency, the energy which is not converted into electrical energy, dissipates in the form of heat. This heat is quite valuable for electric vehicles because one can heat the batteries, if the vehicle is used in colder climates. In the plugging or dynamic braking concept, one dissipates the heat using a bank of resistors through which the current flows. The advantage of electrically applied braking is that the action is fast and there is no wear and tear of parts, as is the case in mechanical braking.

The batteries are stored in an insulated compartment which also stores battery chargers which convert alternating current from the regular supply of electricity. These battery chargers dissipate heat while converting the alternating current into direct current. These have transformers which get heated while functioning. Thus, even this heat can be used to heat the batteries.

The speed control of the motors, thereby of the vehicles, is done using solid state devices such as a MOSFET (the metal-oxide field effect transistors). These are used to switch on and off the battery applied voltage to the motor. In this way, the available energy from the batteries is economically utilized because the energy is supplied only while this switch is on. The greater the time the switch is on, the greater will be energy supplied from the batteries and consequently, the greater will be the speed of the vehicle. These solid state devices also dissipate heat which can be used to heat the batteries.

The heat in the driver's cabin can be supplied by the batteries which supply the current to a resistor situated in the cabin. The second method of heating is using a heat pump which pumps the heat from the surroundings to the cabin using the electrical energy supplied from the batteries. The third method is to use semiconducting thermoelectric elements. These elements pump the heat from the surroundings into the cabin using the current from the batteries. The efficiency of the second method is generally more than the third but, the advantage of the third method is that there are no rotating parts which cause vibrations and noise. In addition, one does not use a working fluid in the third method for pumping the heat which is done in the second method. Some of these working fluids are not environmentally friendly. The heating efficiency of the first method is less than the other two.

The solar panels are mounted using any or combination of these three methods. All of these methods are based on the angular variations of the location of the sun in the horizontal and vertical planes. The idea is to keep the solar rays, as far as possible, perpendicular to the panel and also, to make the incident light on the reflectors attached to the panels, reflected onto the panels.

The horn and various lights such as head light, turn signals, brake light etcetera derive their energies from the batteries.

BRIEF DESCRIPTION OF THE DRAWINGS

FIG. 17a is an enlarged view of the spings of FIG. 17.

THE DESCRIPTION OF THE PREFERRED EMBODIMENT

The vehicle is made up of a translating frame (chassis) and rotating members. Those mechanical elements which are rigidly attached to it (the chassis) undergo translatory motion only whereas, others have rotary motion in addition, when the vehicle is moving along a straight path.

Figure 1:
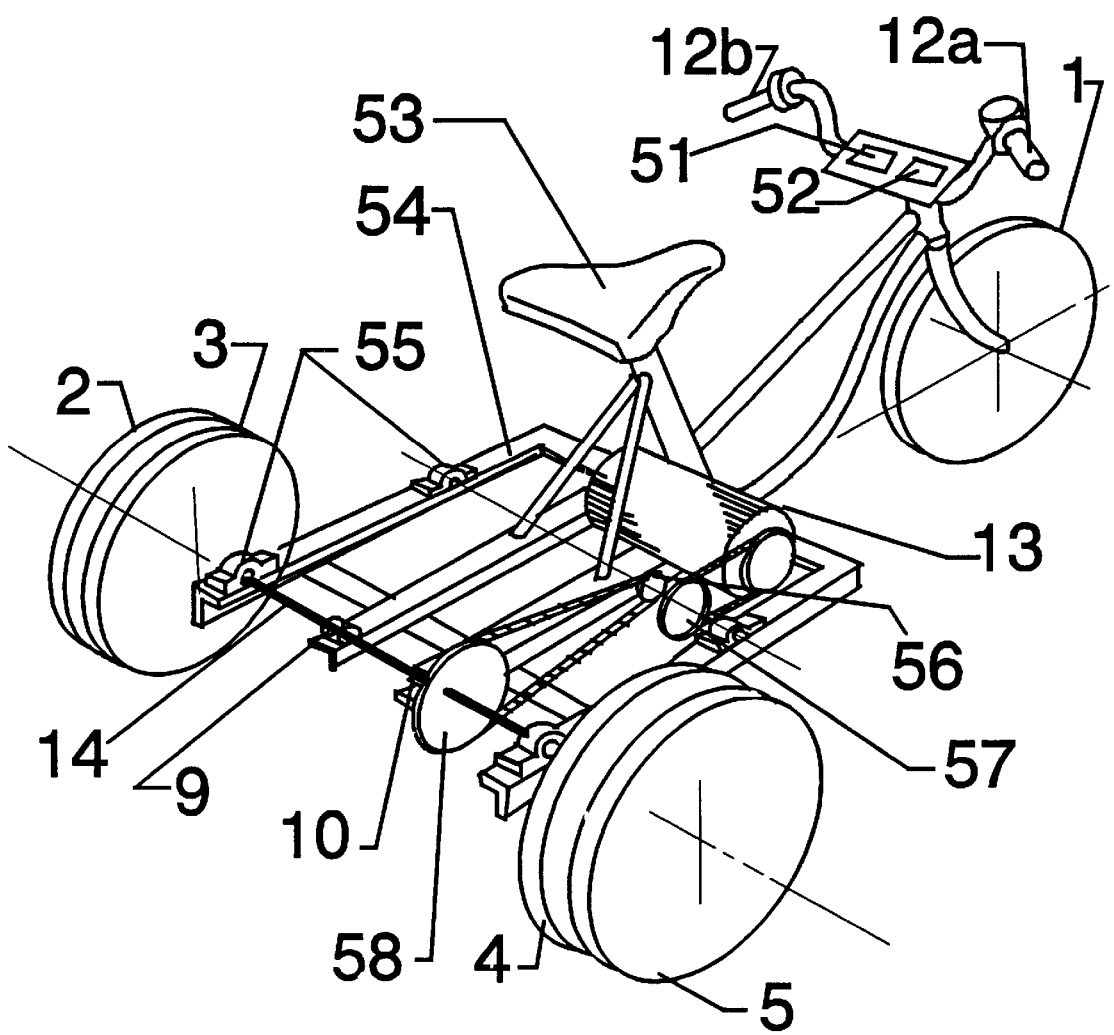
FIG. 1 shows the isometric view of the structure of the vehicle.
Figure 15:
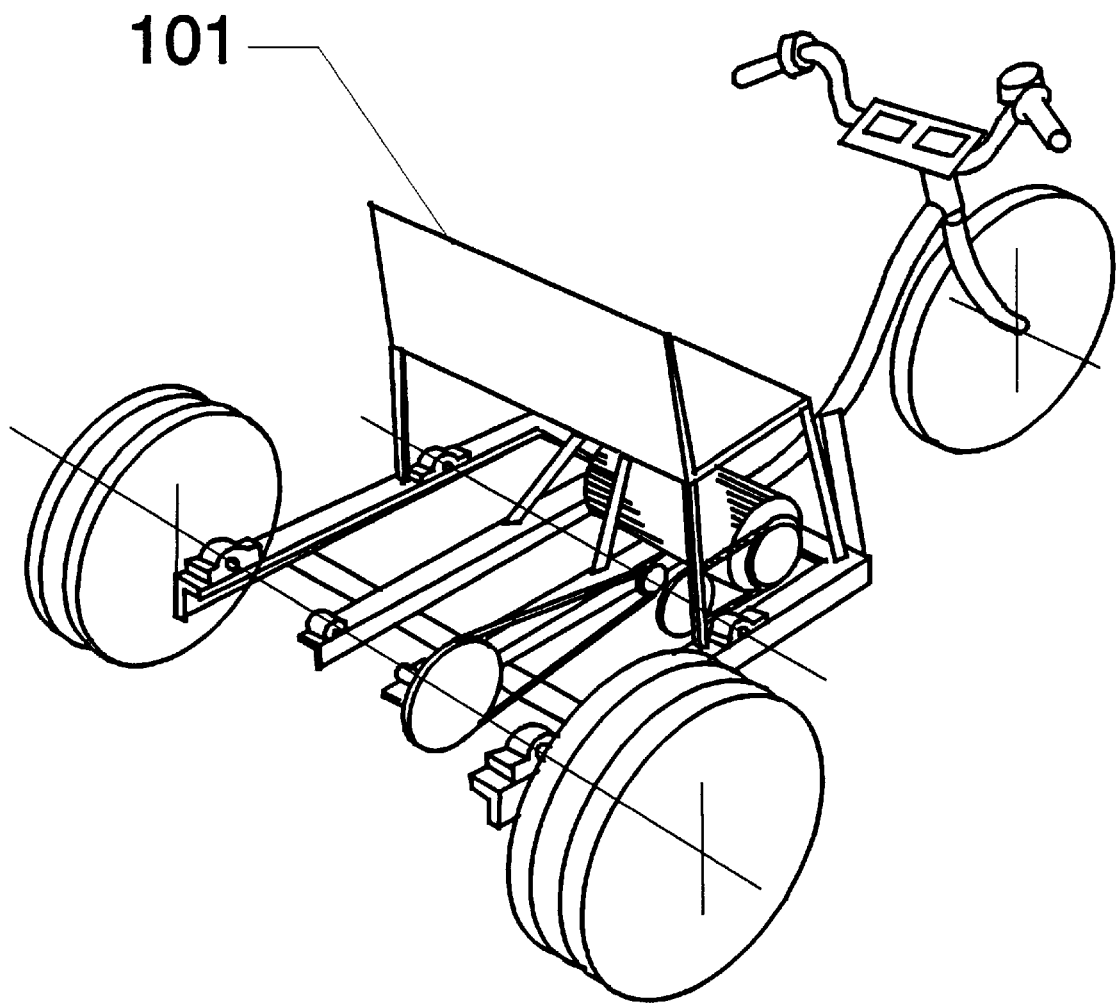
FIG. 15 shows the use of single bench seat.
Figure 16:
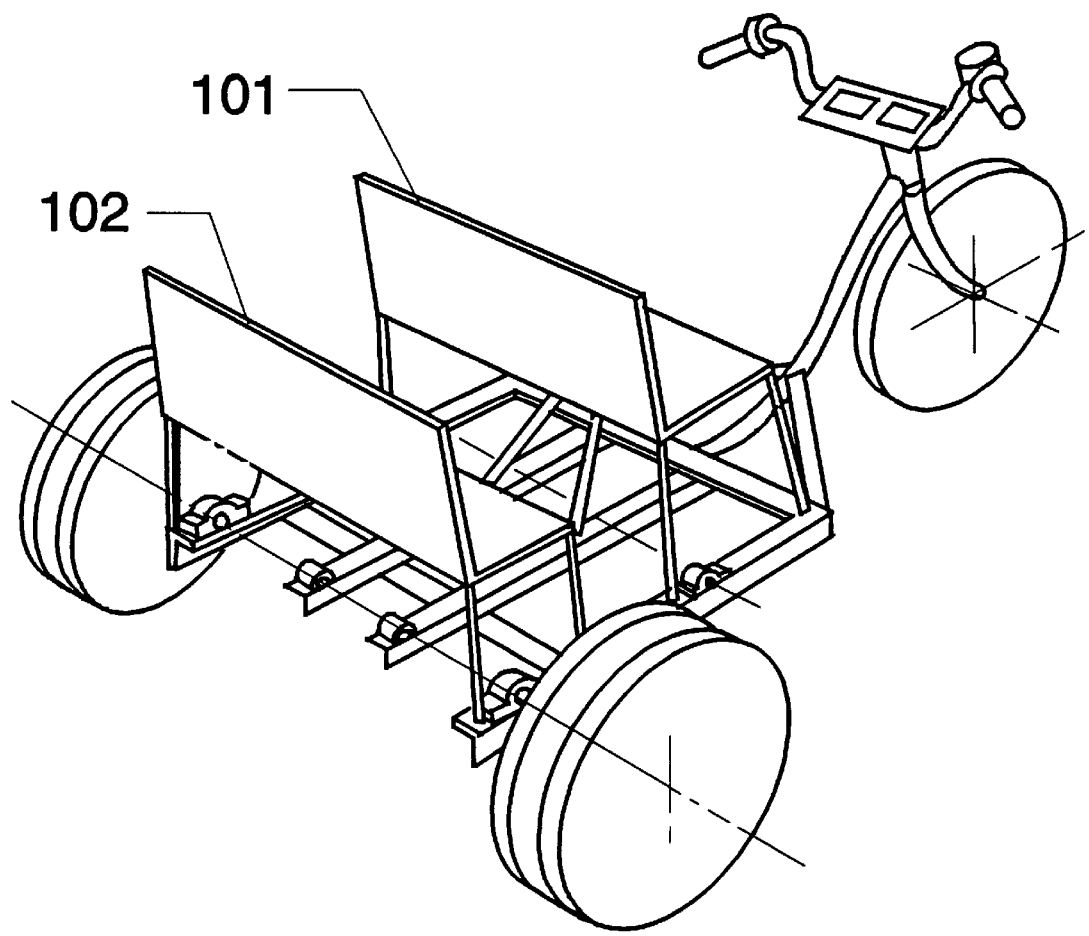
FIG. 16, shows the use of two bench seats.
Figure 17:
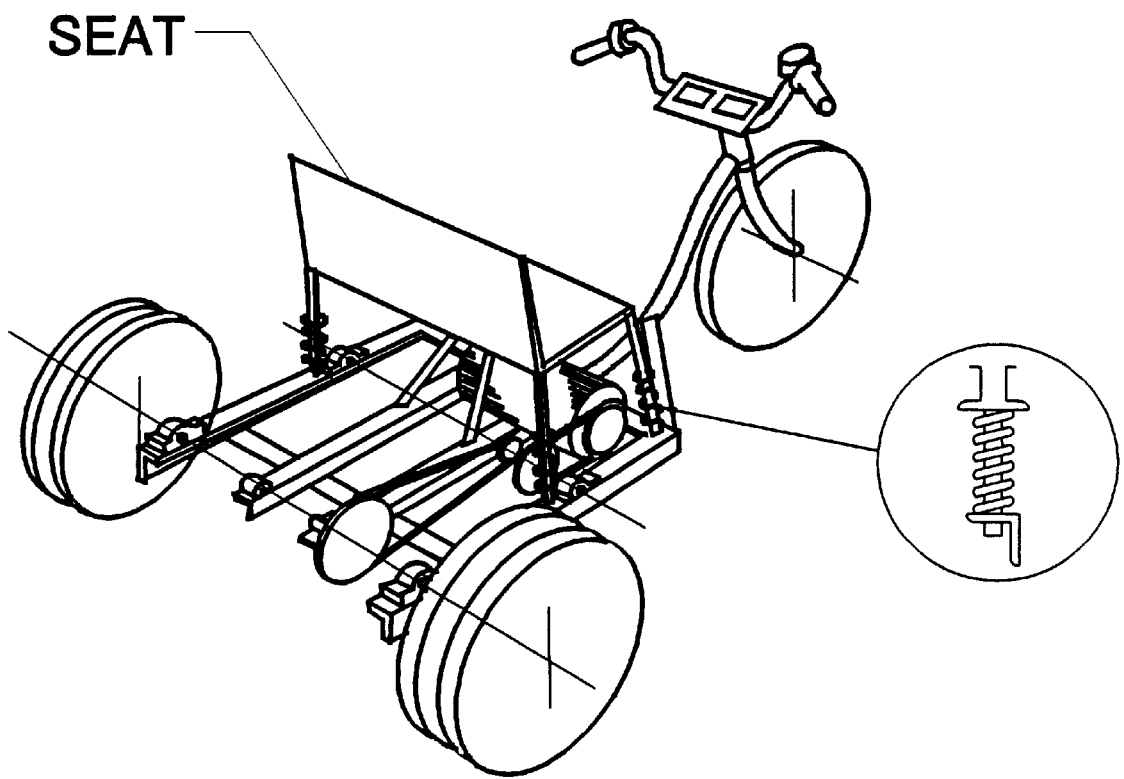
FIG. 17 shows the mounting of seats on springs for vibration isolation.

Referring to the FIG. 1, the motor (13) having a sprocket mounted on its shaft, is attached to the translating frame (54) provides motion to the rear wheels (2, 3, 4 and 5) through sprockets (56, 57, and 58) and chains. Here, the sprockets (56 and 57) are mounted on the same shaft. In this way, one obtains angular speed reduction between the motor (13) and the rear axle (14). One can provide additional rigidity to the axle (14) using two bushings (9 and 10) which are rigidly attached to the frame. One can use one heavy load bearing wheel in the place of two wheels (2, 3), which have light load bearing capacity but are cheaper, for example, those used in bicycles. The disk brakes are attached to the inner wheels (3, 4), and also to the front wheel (1). In the FIG. 1, the labels 51, and 52 show a voltmeter, and an ammeter mounted on a control panel. The labels 12a and 12b show the locations of light, brake, and turn signal controls. The shafts are supported on pillow blocks such as shown by label 55. The location of the driver's seat is shown by 53. Instead of a cycle seat, one can have bench type of seat for more passengers in a single row (FIG. 15) or double rows (FIG. 16). FIG. 17 shows the seat mounted on springs which normally have structural damping. Alternatively, one can use shock absorbers (commercially available) which can critically damp out the vibrations.

Figure 2:
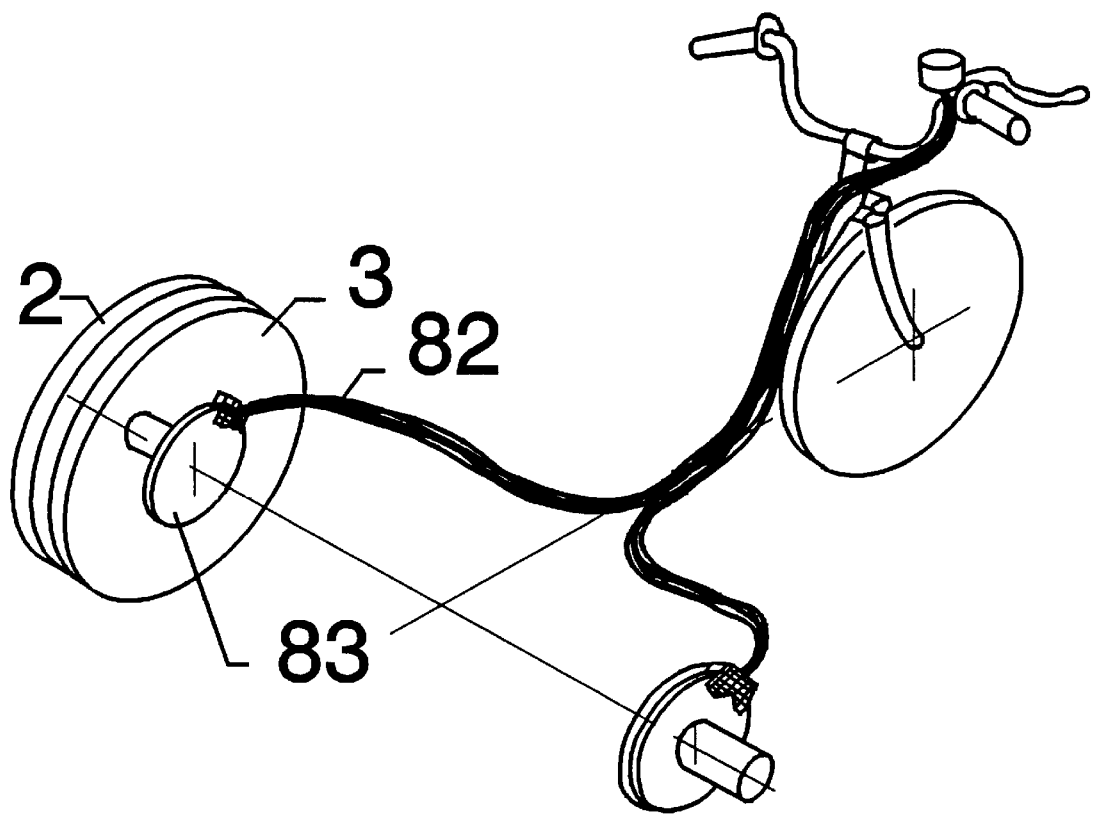
FIG. 2 shows the hydraulic brakes including the hydraulic lines.
Figure 3A:
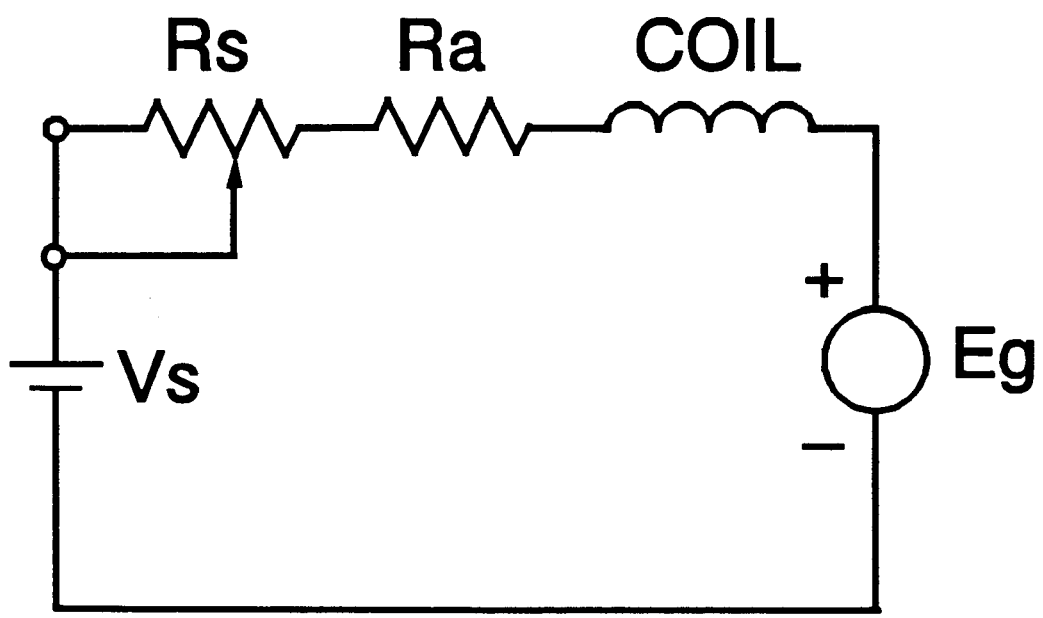
FIG. 3a shows the circuit of the regenerative braking.
Figure 3B:
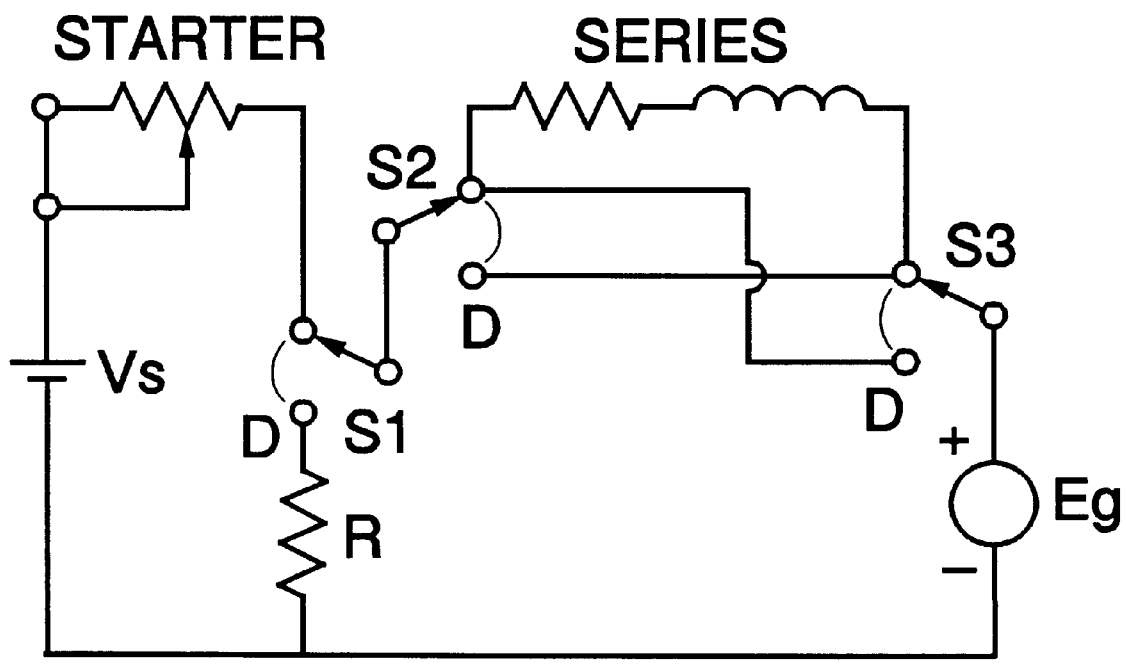
FIG. 3b shows the circuit diagram of the dynamic braking.
Figure 3C:
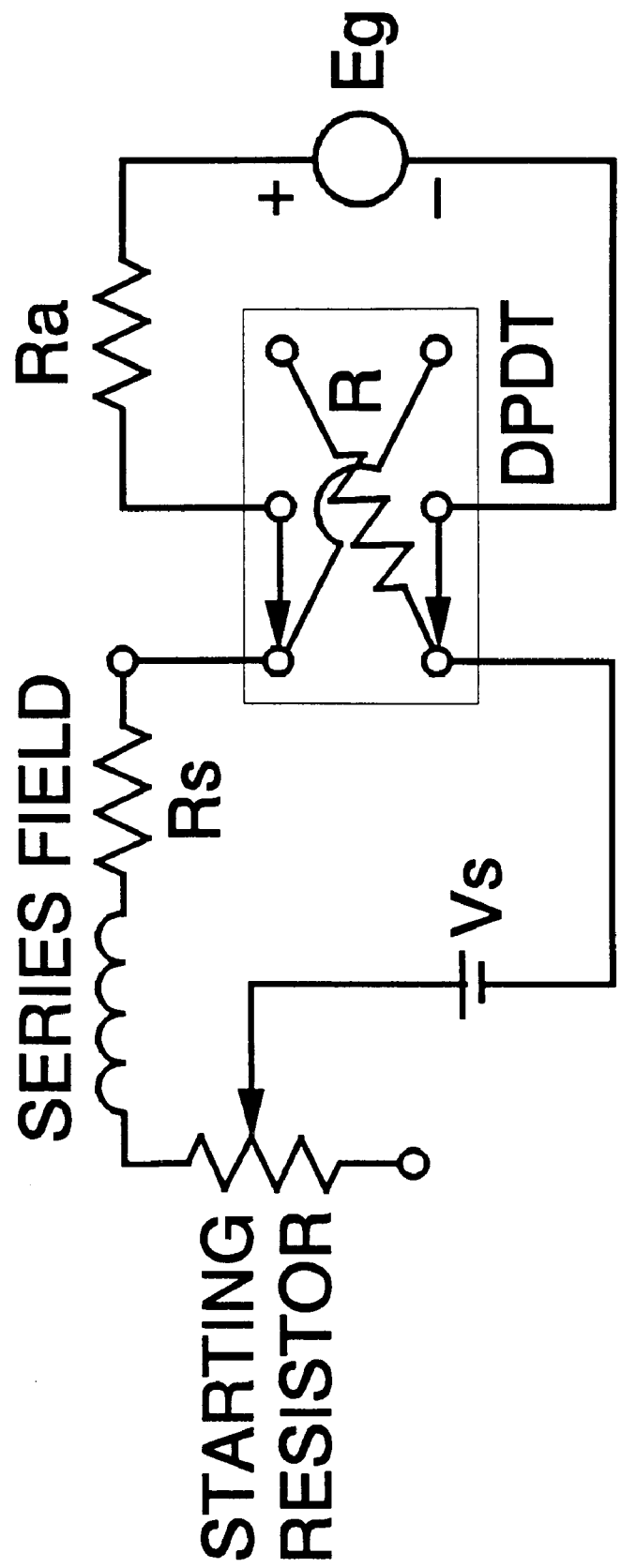
FIG. 3c shows the plugging method of applying the brakes electrically.

FIG. 2 shows the brakes, the disk (83) mounted on the wheel (3) where, the controls located on the handle bar (12a and 12*b* in FIG. 1), can be applied through the hydraulic lines (82) by the driver. The brake on the wheel 1 is not shown in this diagram The control lever is mounted on the handle bar of the vehicle, which is somewhat similar to that used on the motorcycles. The additional electrical braking can be provided using: (a) regenerative braking or, (b) dynamic braking or, (c) plugging. The plugging method has an advantage that the braking action is very rapid but, the disadvantage is that the vehicle can start moving in the backward direction after stopping. It is because of this reason that it is normally not used unless the vehicle carries heavy loads. The driver has to stop applying the brakes as the vehicle comes close to a stop. The circuit diagrams for each of these methods of brake application are shown in FIGS. 3*a*, 3*b*, and 3*c* respectively. In the plugging method (refer to FIG. 3*c*), the double pole double throw (DPDT) switch has to be thrown to the right so that the current generated from the armature windings passes through the resistor R. Here, Ra is the armature resistance; Rs is the starting resistance, and the armature inductance is indicated by a coil. The supply voltage of the batteries is shown by Vs and the back electromotive force (emf) of the motor is indicated by Eg. In the case of dynamic braking as shown in FIG. 3*b*, the switches $S_1$, $S_2$, and $S_3$ are connected to their corresponding D positions when the brake is applied. FIG. 3*a* shows the regenerative braking where there is no external resistor. When the applied voltage is less than the back electromotive force (emf), the current direction reverses and the batteries get charged (refer to FIG. 3*a*). The variation of the applied battery voltage is carried out using solid state devices (for example, MOSFETS) which are called controllers.

Figure 4:
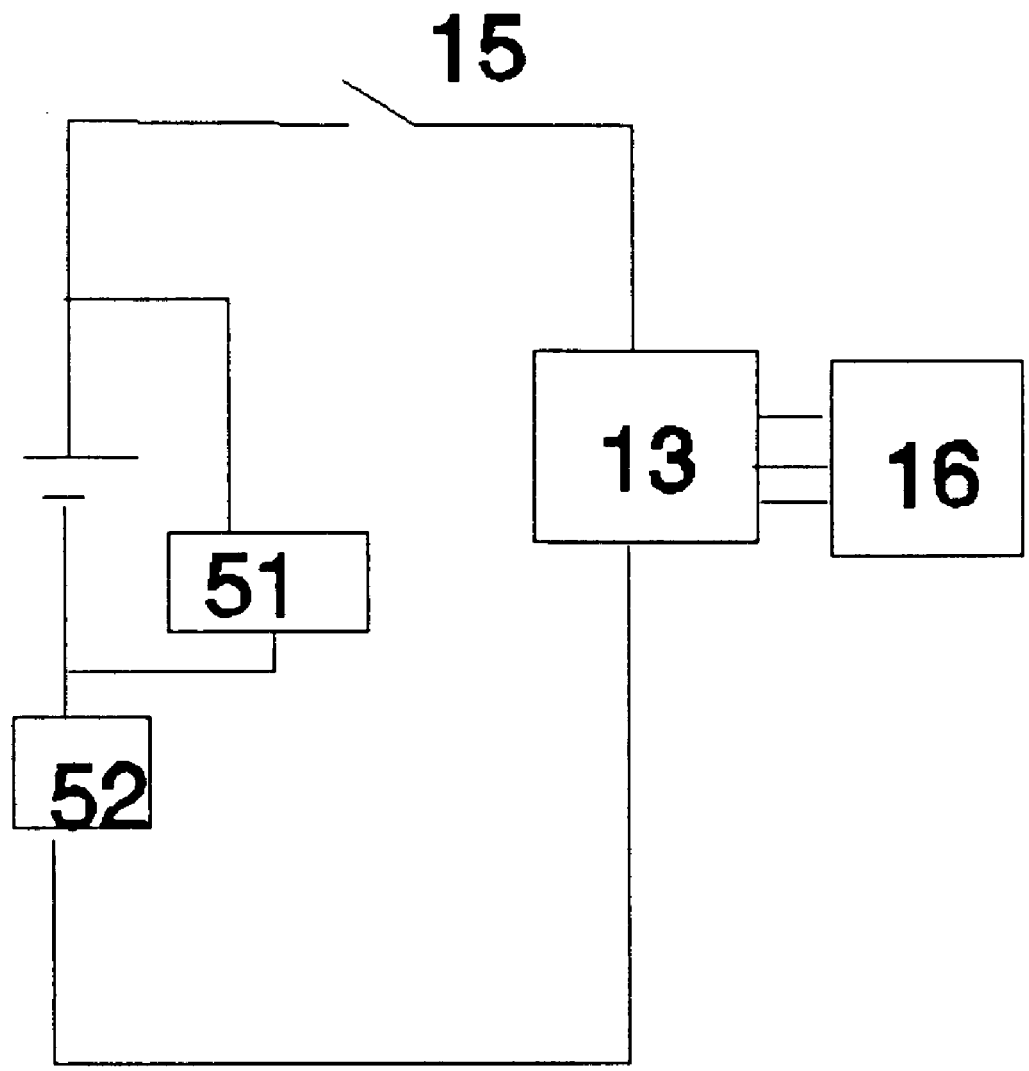
FIG. 4 shows the electrical connection between the motor and the batteries for driving the vehicle.

FIG. 4 shows the energy supply to the motor (13) through a solenoid switch (15). This switch, in the off position, shuts off the power to the motor (13) -controller (16) system. The controller, in addition, commands the motor to rotate in either the forward or reverse direction. The voltage supplied by the batteries is measured using a voltmeter (51), and the current, using an ammeter (52). The charged condition of the batteries can be known from the voltage readings.

Figure 5:
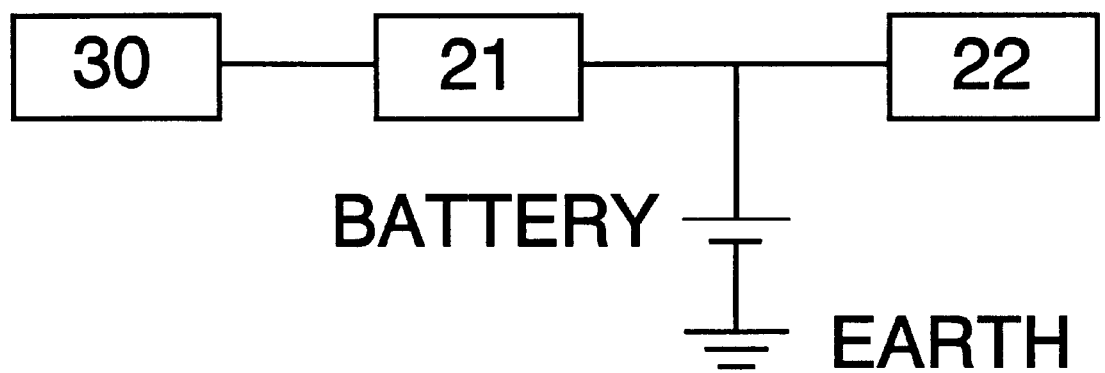
FIG. 5 shows the charging of the batteries by solar panels as well as the battery chargers.

In FIG. 5, one can see the batteries being charged by solar panels (30) through charge controller (21) or through the battery chargers (22) which have built in charge controllers.

Figure 6:
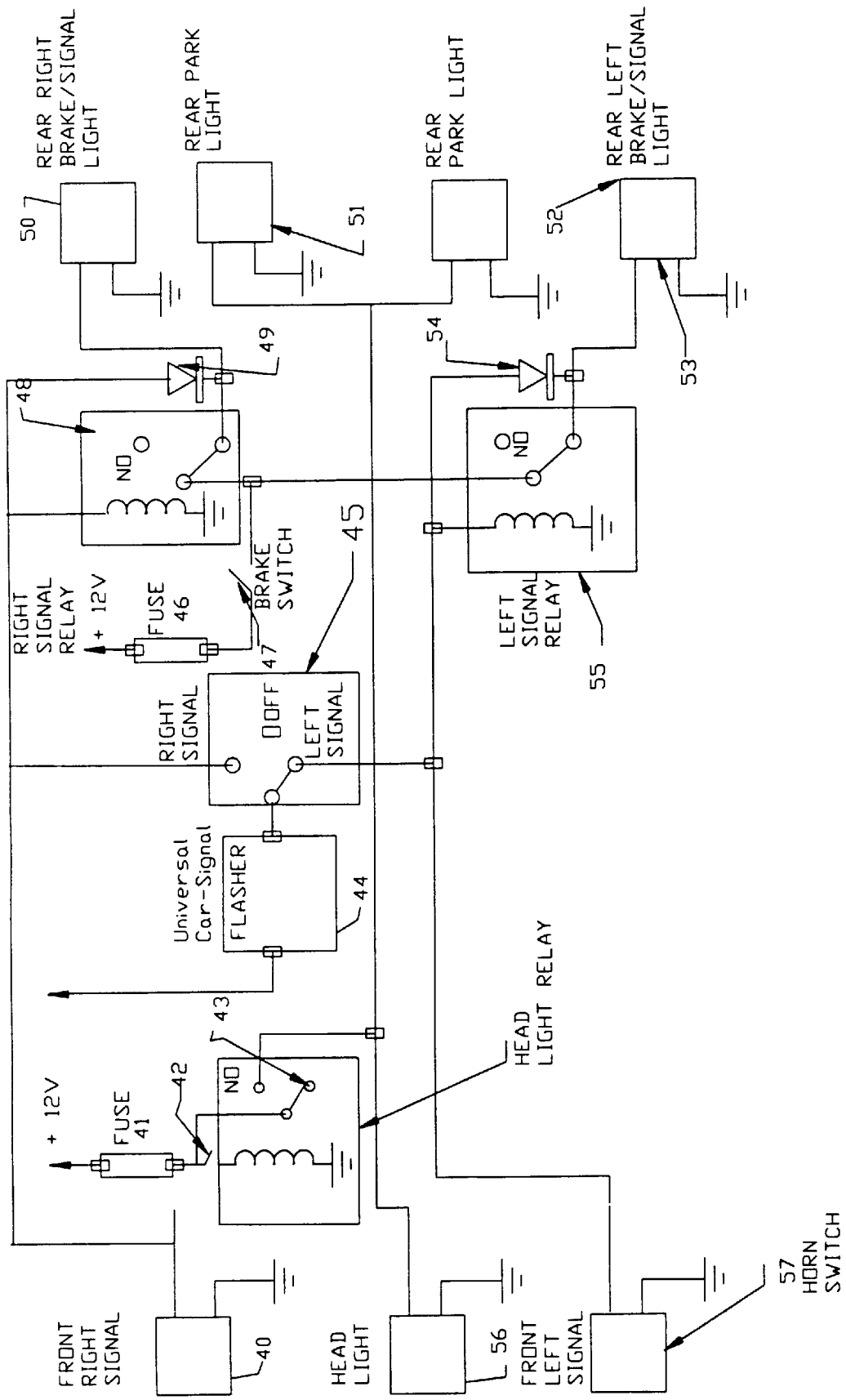
FIG. 6 shows the circuit diagram for head lights, turn signal etcetera.

FIG. 6 shows the circuit diagram for the light, turn signals, and the brake lights. It shows fuses (41, 46), relays (43, 48, 55), diodes (49, 54), and flasher (44), among other things. The head light is switched on using switch (42) by activating the relay (43). In this case the two rear lights are also turned on. The brake lights (51, 53) are activated by switch (47). The turn signal lights are activated in one the two positions corresponding to left or right using the three way switch (45) which is connected to the flasher (44). The diodes allow one way current. Their use becomes necessary when, for example, one is turning left by activating switch (45) and when the brake are applied simultaneously. This (switch 45) activates the relay (55). The flasher overrides the braking switch effect only for the rear left light. The rear right light will still be on.

Figure 7:
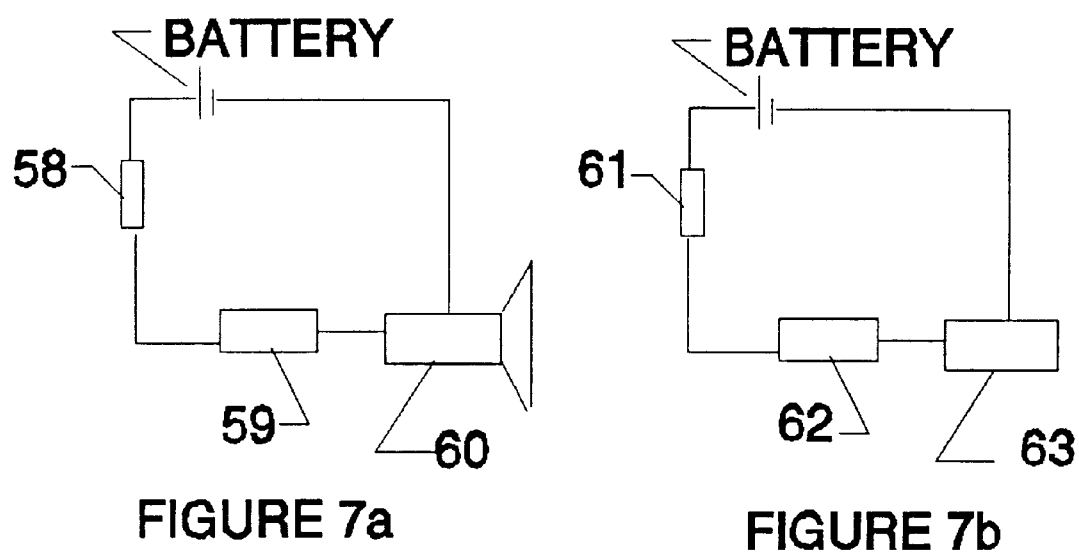
FIG. 7a shows the circuit diagram for the horns.
FIG. 7b shows the circuit diagram for the heating system.

The circuit diagram for the horn is shown in FIG. 7*a*. The horn (60) is activated by a solenoid switch (59). A fuse (58) is used for safety. The heating of the driver's cabin can be done based on FIG. 7*b*, where one can use any of the three elements or systems which are: (1) a resistor, (2) a heat pump, and (3) a semiconducting thermoelectric element. One of them used, is represented by (63) where the switch is shown by (62). One would have to use a fuse (61) of appropriate value in any of these three cases.

Figure 8:
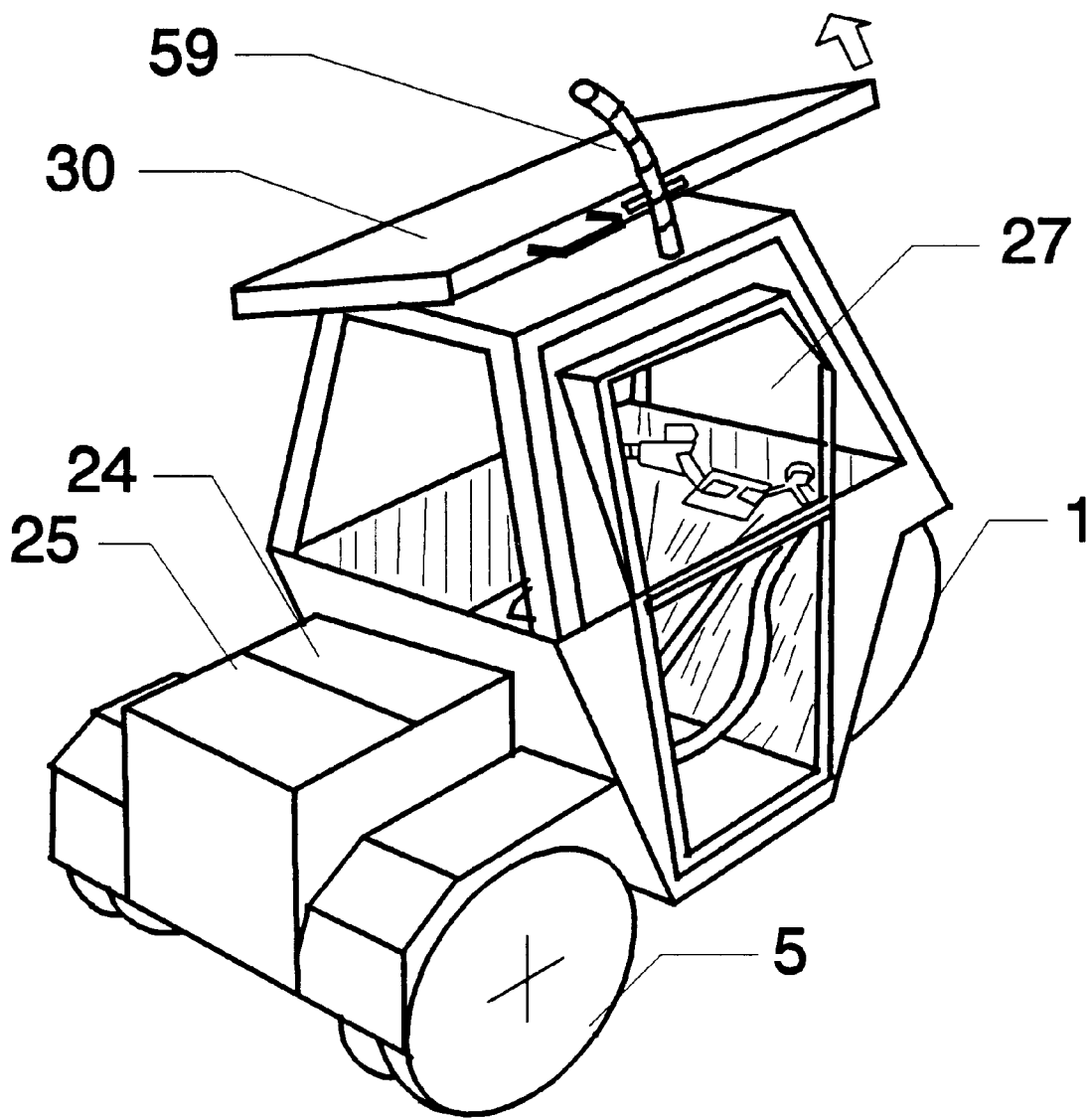
FIG. 8 is an isometric view of the vehicle from the back.

FIG. 8 shows the main body of the vehicle which has several compartments, with the driver's cabin in the front. The entrance into the cabin is through the door (27). The rear of the vehicle has two compartments (24, 25). The batteries, which are heavy, are kept in the front compartment (24) which is close to the rear wheels, and it is between the front wheel (1) and the rear wheels. This way, the main battery weight is taken up mainly by all the rear wheels. The chargers are located in compartment (25) because they are light. Since they are light, they can be located in the overhung portion of this compartment. The compartments (24) and (25) are insulated externally but not internally. The motor controller is also located in the compartment (24) along with the external resistor, if the dynamic braking or plugging is used. These resistors would dissipate heat into the lower two compartments (24, 25) which are insulated on their exterior walls. Thus, all the heat generated from the electrical devices i.e. from the chargers, resistors used in the electrical braking system, and the controller, is kept within the insulated volume space within the chambers (24, 25). The solar panel (30) is mounted on the roof of the vehicle with its axis of rotation horizontal, if the wheels are resting on the horizontal plane. The panel is held in a given position by a link 59.

Figure 9:
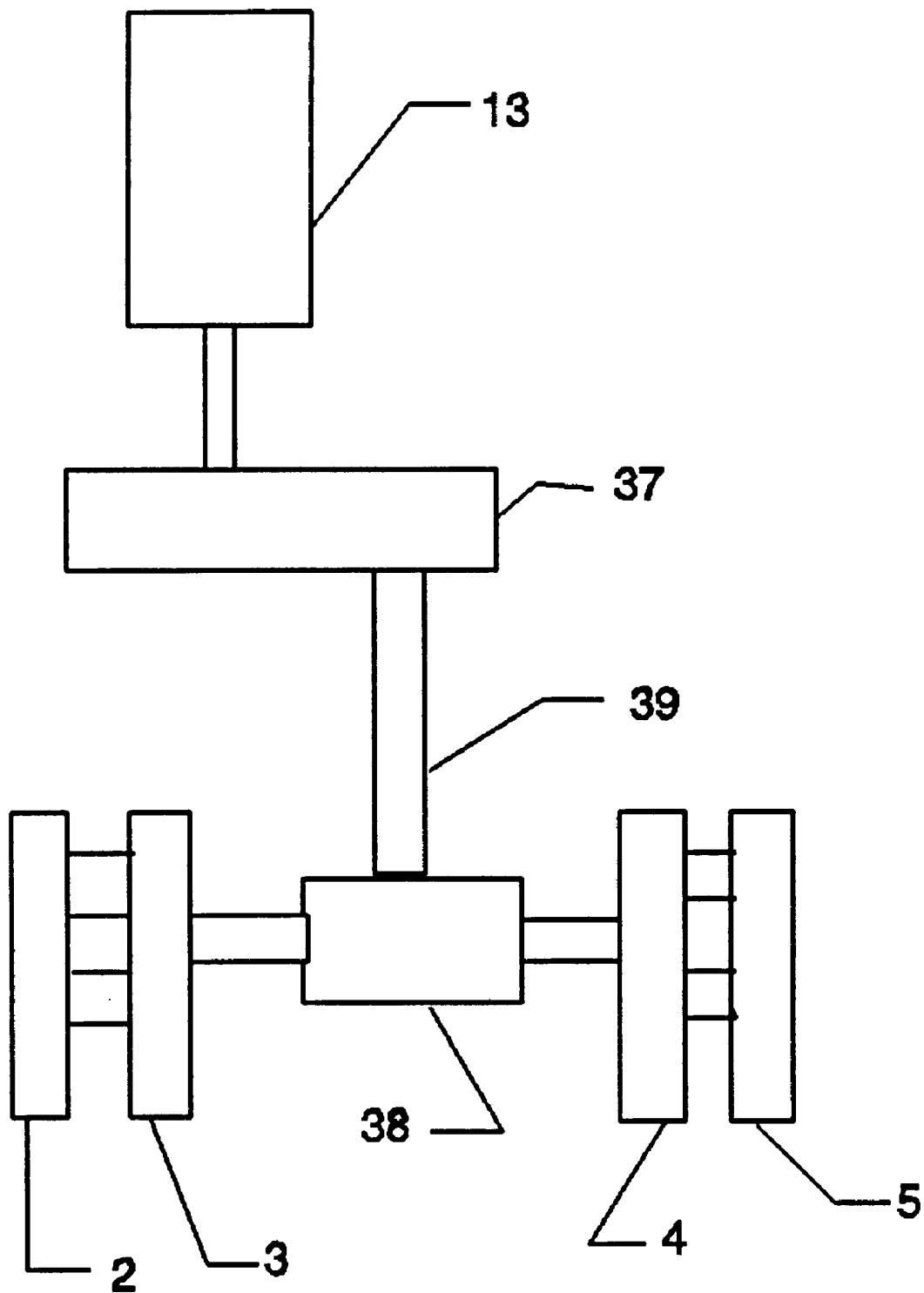
FIG. 9 shows an alternate drive system using the differential gearing system.

In the FIG. 1, wheels (4 and 5) are rigidly connected to each other, and to the axle (14) to act as the driving wheels for the vehicle. Here, no differential gearing system is shown. FIG. 9 shows the differential motion being provided to the rear wheels where the motor drives the wheels through the differentials (38), gear box (37), and shaft (39). It should be noted that when one is applying the motion to the rear axle without the differentials, and when the dynamic braking or plugging is used, the left rear wheels would be free. The right wheels drive the vehicle by friction. The result would be that the vehicle would have a tendency to turn to the right. Therefore, one would have to be cautious. The hydraulically applied brakes would stop the vehicle without any tendency to turn.

Figure 10:
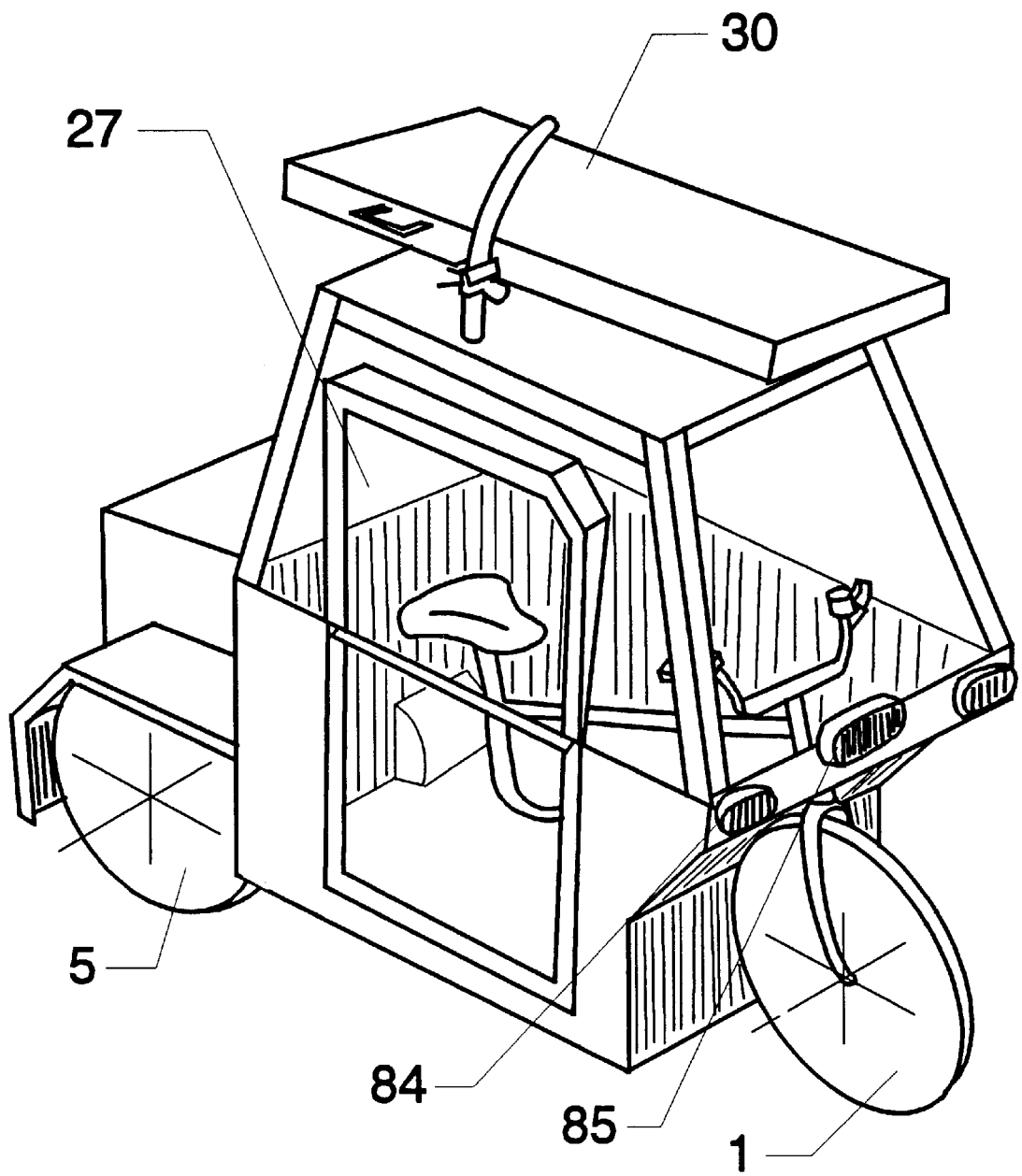
FIG. 10 is an isometric view of the vehicle from the front.

FIG. 10 shows the view of the vehicle from the front. Here, one can clearly see the turn signal (84), and the head light (85).

Figure 11:
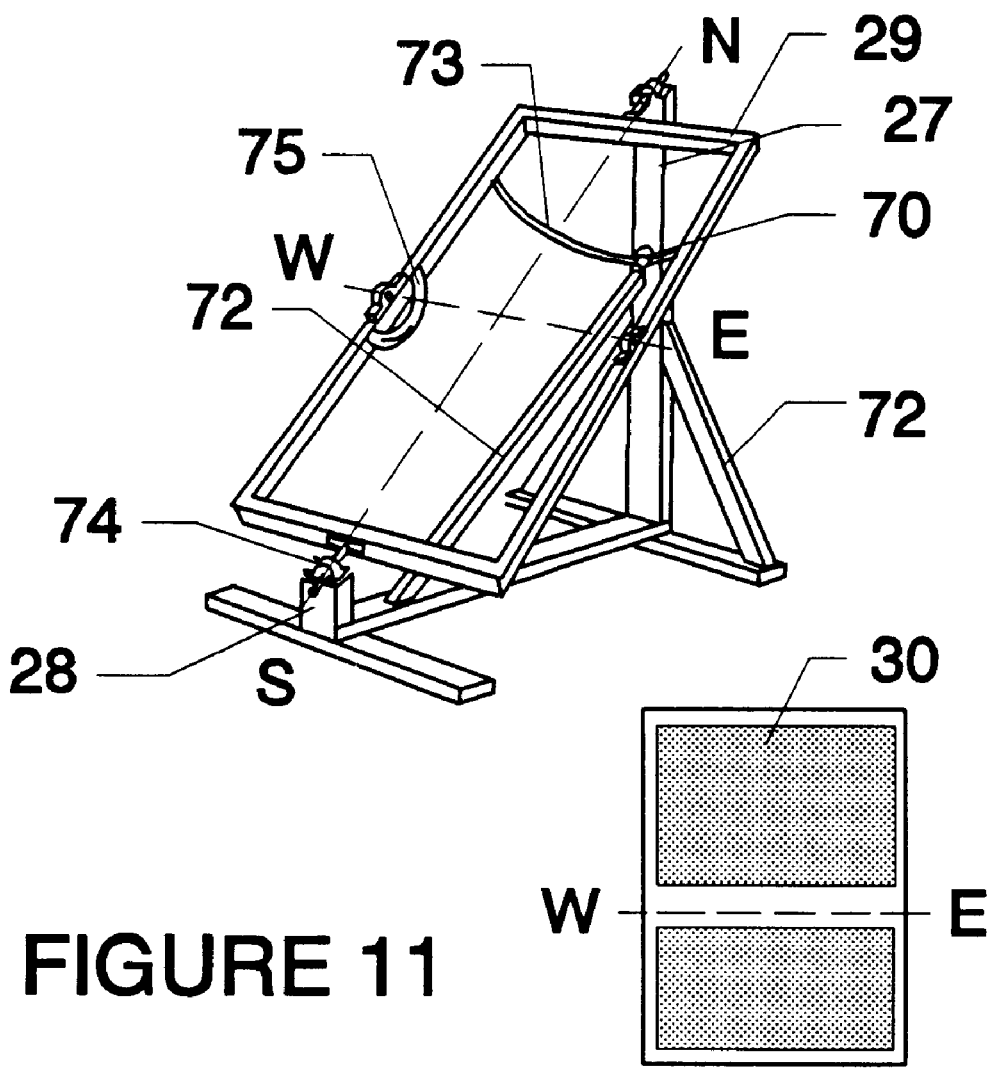
FIG. 11a shows the isometric view of the structure for tracking the sun manually.
FIG. 11b shows the use of stepper motor for tracking the sun.
FIG. 11c shows the electrical wiring diagram for the use of limit switches which are used to stop the stepper motor.

One can track the sun and have its rays fall perpendicular to the solar panel by three methods. In FIG. 8, the tracking of the sun can be done by rotating the panel (30) about its rotational axis which is located on one of its edges (rotation about the horizontal axis), and by turning the handle bar (refer to FIG. 1), which causes the whole body of the vehicle to rotate (rotation about the vertical axis). Thus, using two mutually perpendicular axes of rotations, one can track the sun while the vehicle is parked. FIG. 11 shows the solar panel mounting set up by another method (the second method) which is quite suitable for mounting the solar panel in the rear of the vehicle. In this second method, there are two posts (27, and 28) where the latter is of a smaller height than the former. A rectangular member 29 is supported on these two posts through pin connections on both the ends. In the northern hemisphere, the taller post will be on the north side, and the other one on the south side. The heights of the posts have to be such that the axis of rotation of the frame (29) is inclined at angle equal to the latitude of the place of use. To hold the post (27) in the vertical orientation, one may need braces (71, 72). The third brace on the west side is not shown here. The four directions i.e., east, west etc. are indicated by E, W, S, and N. A semicircular shaped solid bar (73) is rigidly attached to the frame (29). The centre of this semi-circle coincides with the trace of the axis of rotation of the member (29) on the plane containing this semi-circular bar. In this way, the frame (29) can be held in a given angular position by applying a stopping mechanism shown at the location indicated by the label (70). This way, the frame is locked in a given position with respect the post (29). Alternately, this locking can be applied at the post (28) also. The label (75) shows a similar arrangement for mounting the solar-panel frame (30) along the east-west axis (the frame containing the solar panels is shown separately). This axis is used for the seasonal variation of the sun. In the frame shown separately, there are two solar panels shown by dark shaded areas. There is a gap between the two panels. One can mount the panels by having the posts (27, and 28) in the back of the vehicle on the compartments (24, and 25) shown in FIG. 8. The gap between the panels shown here, would provide unobstructed view of the back to the driver.

Figure 12:
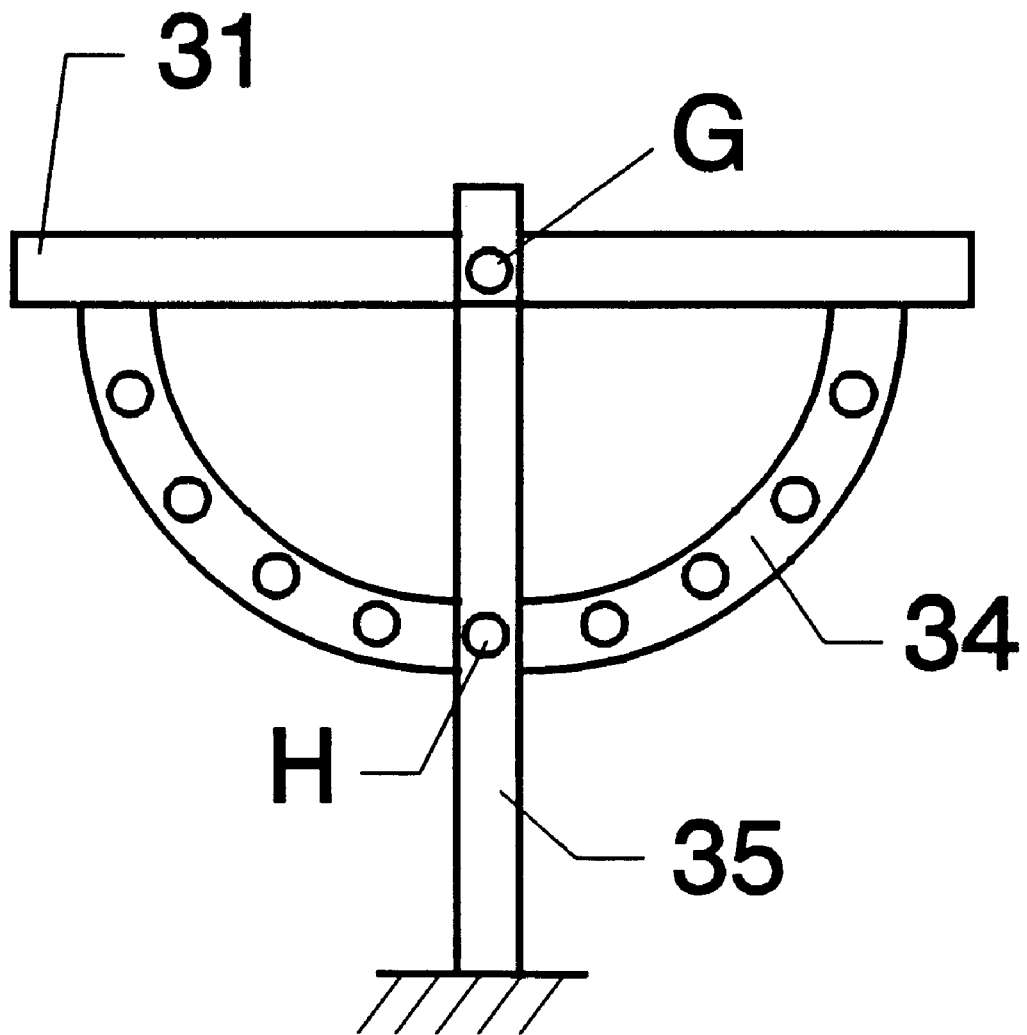
FIG. 12 shows the arrangement for locking the rotating frame in a given position.

The third method of mounting the solar panels is shown in the FIG. 12. This method can be used in place of the first method. Here, the panel (31) is supported on two posts of equal height which are mounted on the roof of the driver's cabin shown in FIG. 8. The posts are to be fixed on the centre-line of the roof along its length. In other words, one of these posts will be at the front, and the other, at the back of the roof. In FIG. 12, the semi-circular shaped body (34) which is made out of a thin sheet, has holes punched at regular angular intervals. This is rigidly attached to the panel (31). The panel (31) is hinged at the point G, so that it can rotate about this point (the rotation of the panel with respect to the post (35)). The rotational axis is horizontal here also. The post (35) is rigidly attached to the roof of the driver's cabin. In this way, one can rotate the panel (31) about the point G, where the rotation axis is horizontal, such that one gets as much solar energy as possible on this panel. In a given angular position, the panel is locked at the point H with a wing nut and a bolt. There is a hole in the post (35) at the point H.

Figure 12A:
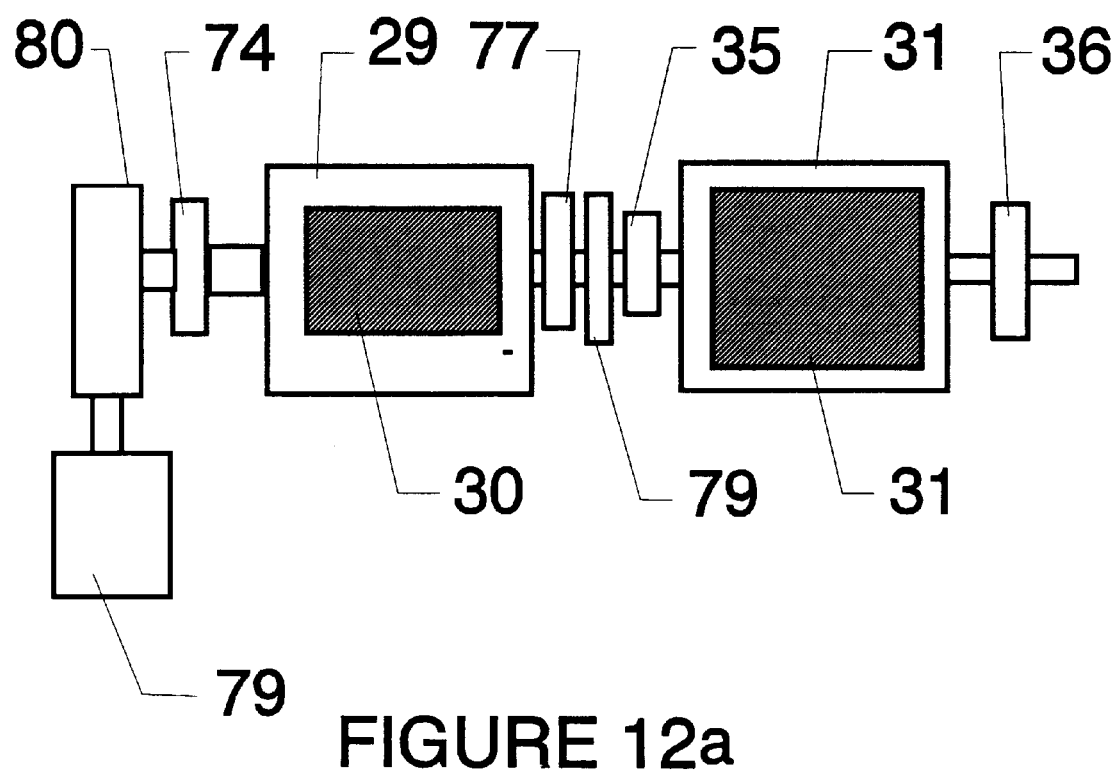
FIG. 12a shows the use of universal joint which enables two panels with different spatial orientations to be rotated simultaneously using a single motion.
Figure 20:
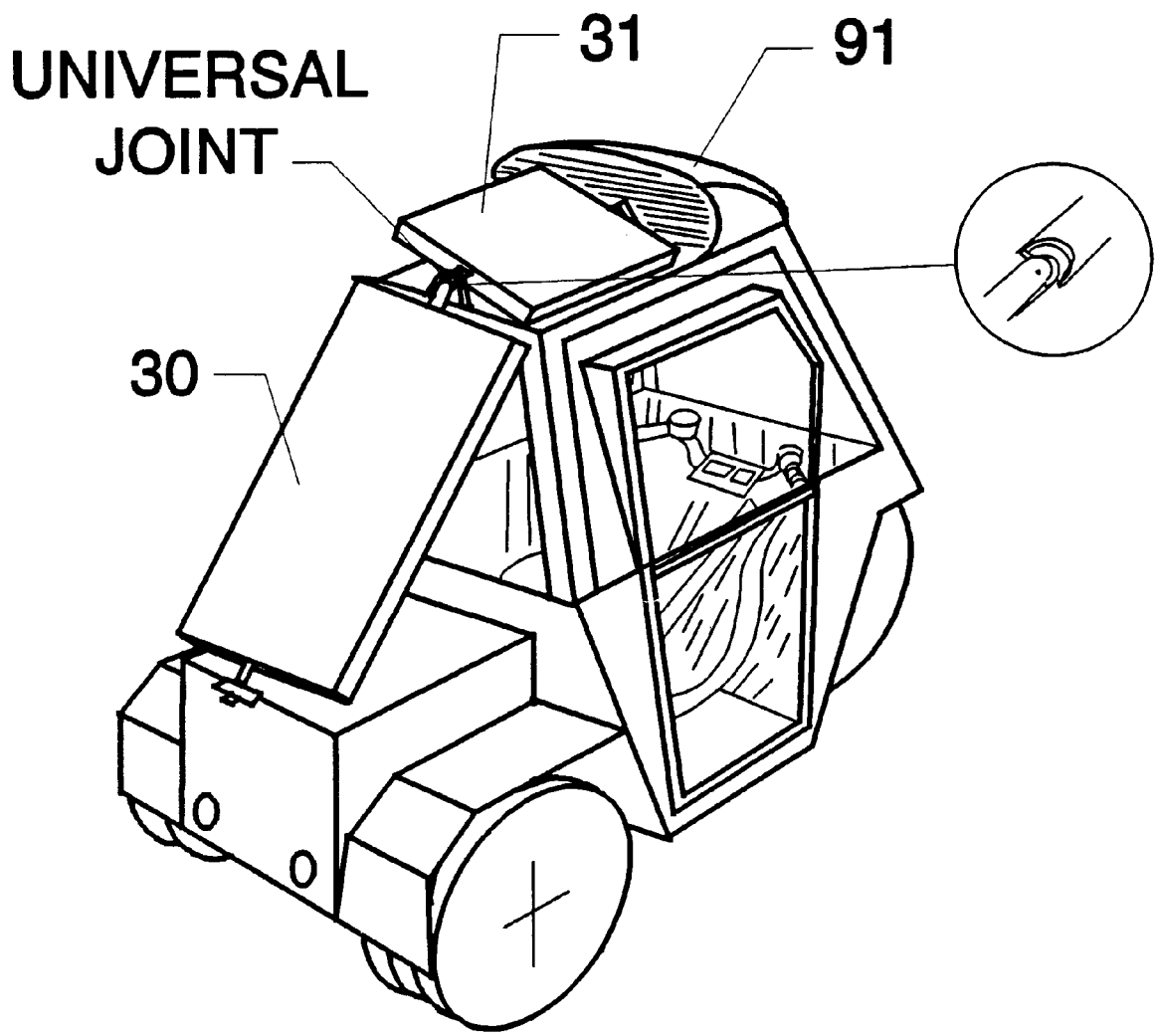
FIG. 20 is an isometric view of the vehicle from the back showing the connection using an universal joint between the two panels with different spatial orientation.

One can use the second and the third methods to mount as many solar panels as possible on the vehicles. However, one can use a combination of the second and the third methods using single rotational motion by using an universal joint as shown in FIG. 20 and 12a. In the FIG. 20, a wind deflector (91) has been used to decrease the wind resistance.

Figure 11B:
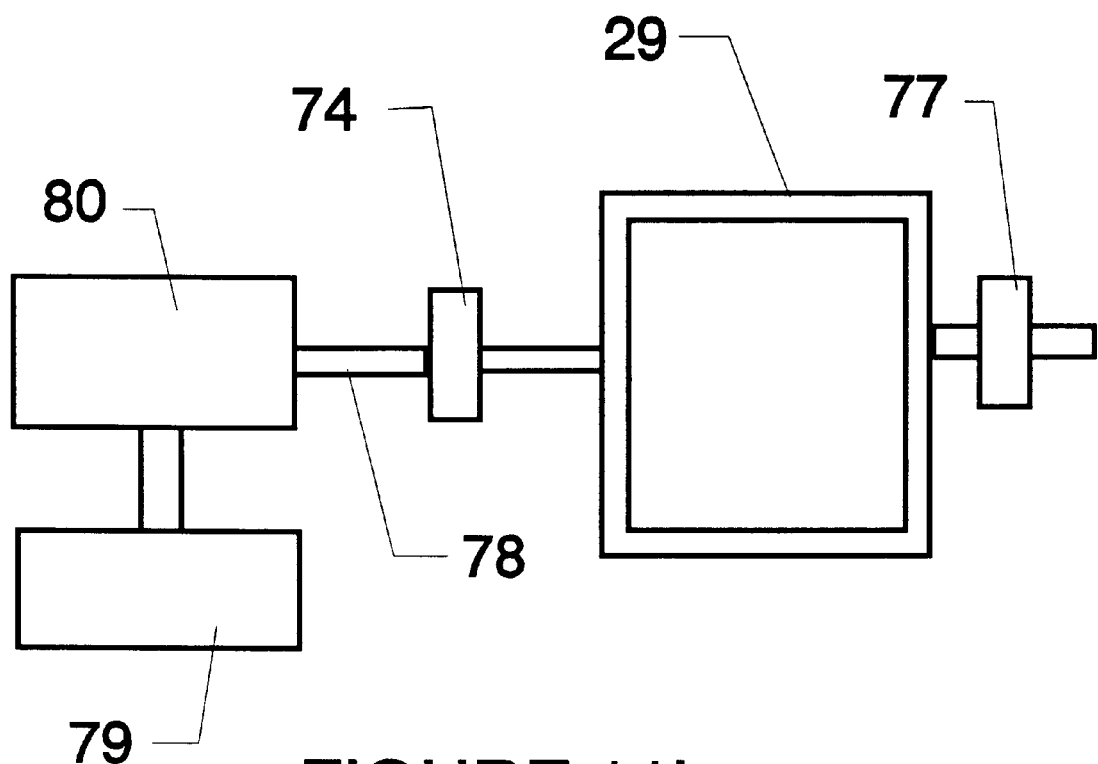

One can also track the sun using a stepper motor (79) as shown in FIG. 11b. Here, the stepper motor (79) drives the shaft (78) through a gear reduction box (80) where, a worm is mounted on the motor shaft, and a worm gear on the shaft (78). If we look at the FIG. 11, the rotating frame (29) carries the solar panels. These are supported on the pillow blocks (74, and 77). The pillow block (74) should have a tapered roller bearing (to take up axial and radial loads), and the other one (77) can have a ball bearing.

Figure 11C:
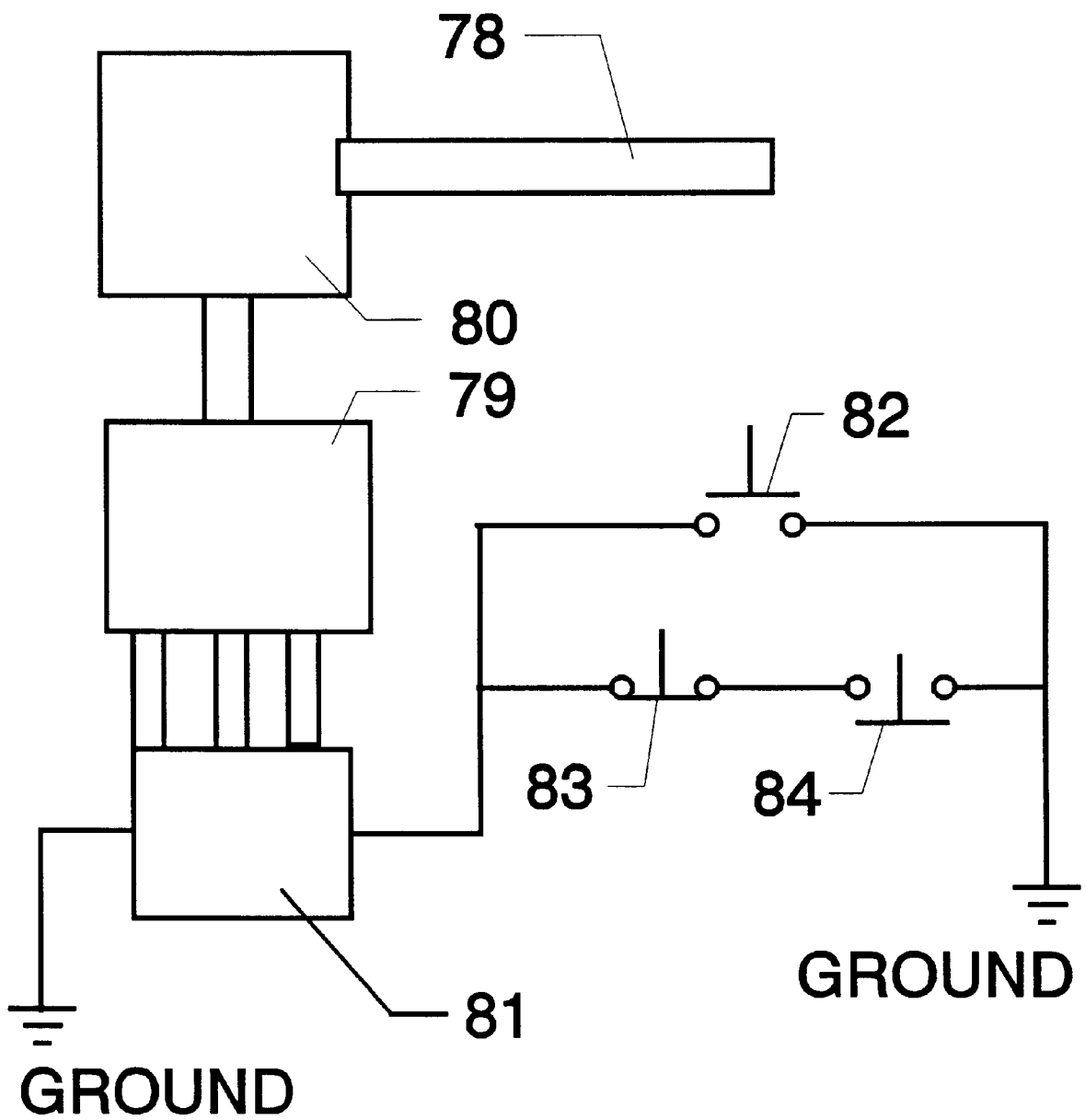

FIG. 11c shows the circuit diagram for the stepper motor (79). Here, the controller (81) can provide controls to rotate the motor (79) in either forward or reverse direction, and also, with two speeds. One speed is for rapid rotation to align the panels normal to the sun in the beginning, and then the slow or the tracking speed which is equal to the rotational speed of the earth (1 revolution in 23 hours and 56 minutes approximately). The tracking motion is in opposite rotational sense to that of the earth. This figure shows two limit switches (83, and 84), one for the morning and the other one for the evening position. The re-start switch (82) is used to re-start the motor after changing over the direction of rotation of the motor.

The first method is useful but, one would not be able to track the sun in both, mornings and evenings using this method, if the second method is also used. The tracking conditions for the two methods cannot be satisfied simultaneously. In the second method, the tracking is done by the rotation about the north-south inclined axis. The rotation about the east-west axis is needed for the seasonal variation of the sun's position Thus, on a given day, only one rotation about the north-south is needed.

Figure 13:
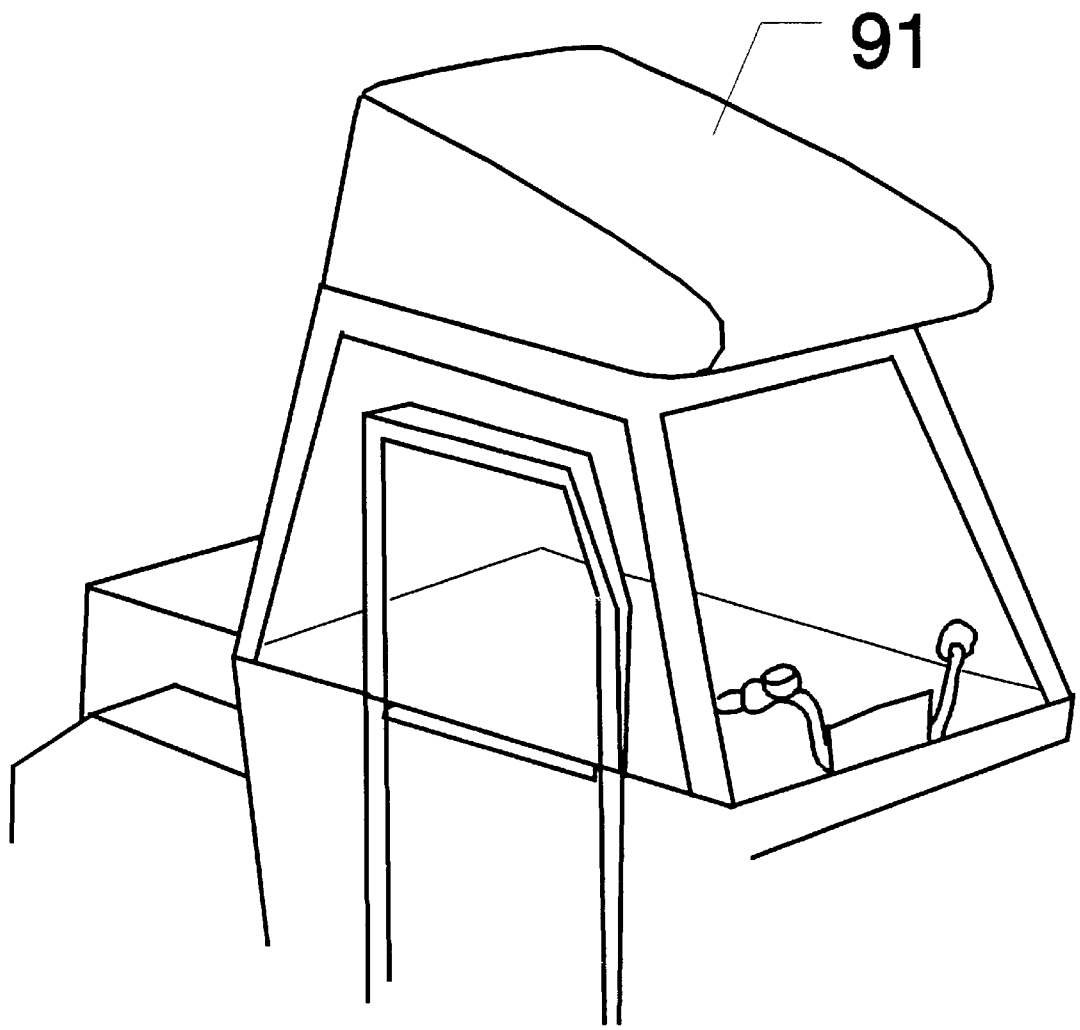
FIG. 13 shows the positioning of the wind deflector which is used to decrease the wind resistance when the vehicle is in motion.

One can use a wind deflector (91) to minimize the resistance due to the flow of air (refer to FIG. 13). This wind deflector would ensure that the wind resistance due to the panels used in the second method is a minimum.

Figure 14:
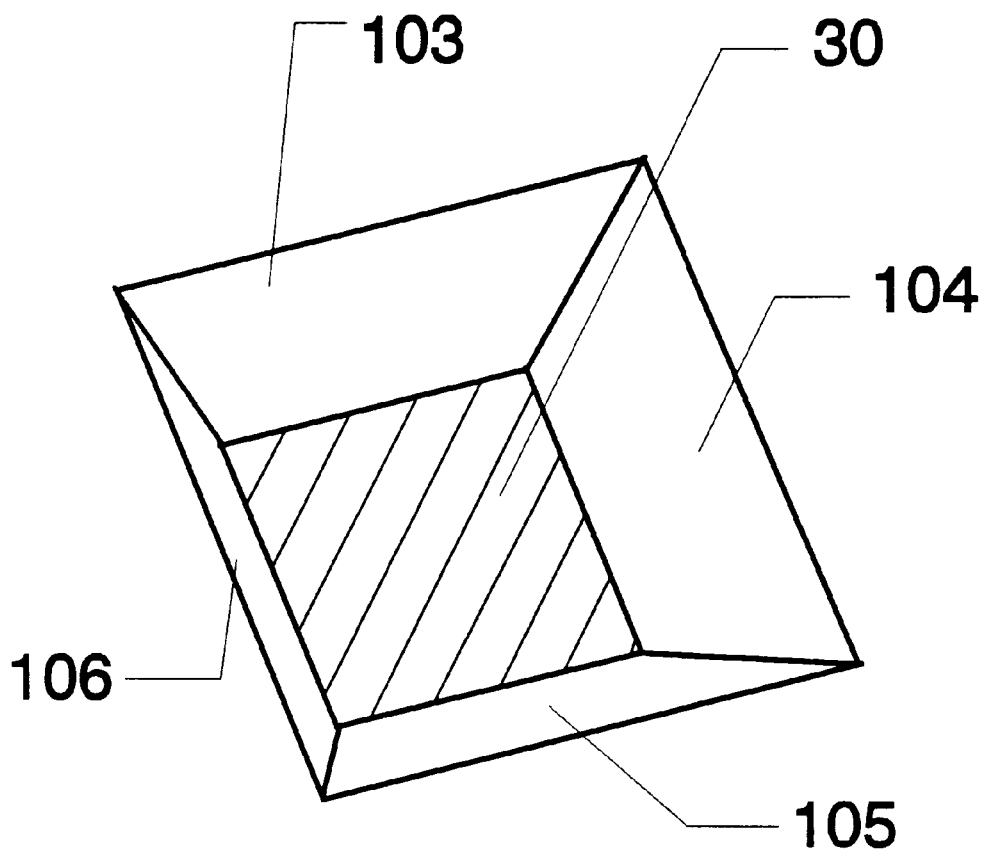
FIG. 14 shows the use of reflectors for increased conversion of the solar energy into the electrical form.

It may be beneficial to use reflectors (103, 104, 105, and 106) on the panel (30) as shown in FIG. 14. The use of the reflectors is optional but, it should be used as much as possible. This would concentrate the solar rays onto the panels, thus economizing in cost of the panels which are expensive.

The necessary details about the bench seats (FIGS. 15 to 17) have been discussed earlier.

Figure 18:
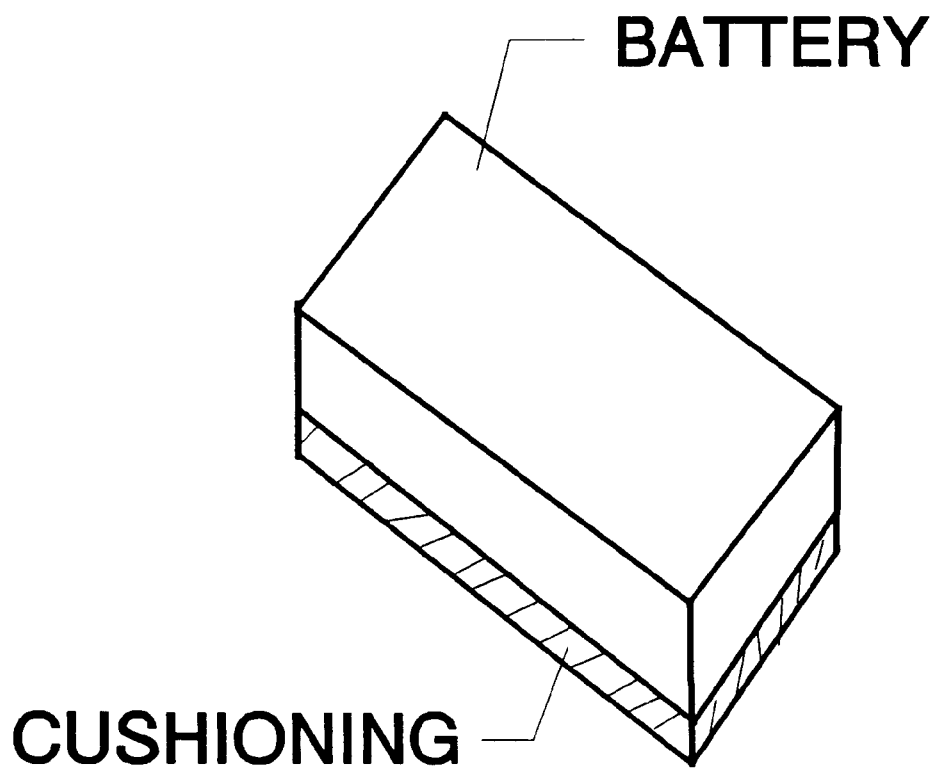
FIG. 18 shows the mounting of the batteries on cushioning material.

The vibration minimization of batteries can be done as shown in the FIG. 18. Here a cushioning material is used at the bottom of the batteries to damp out the vibrations.

Figure 19:
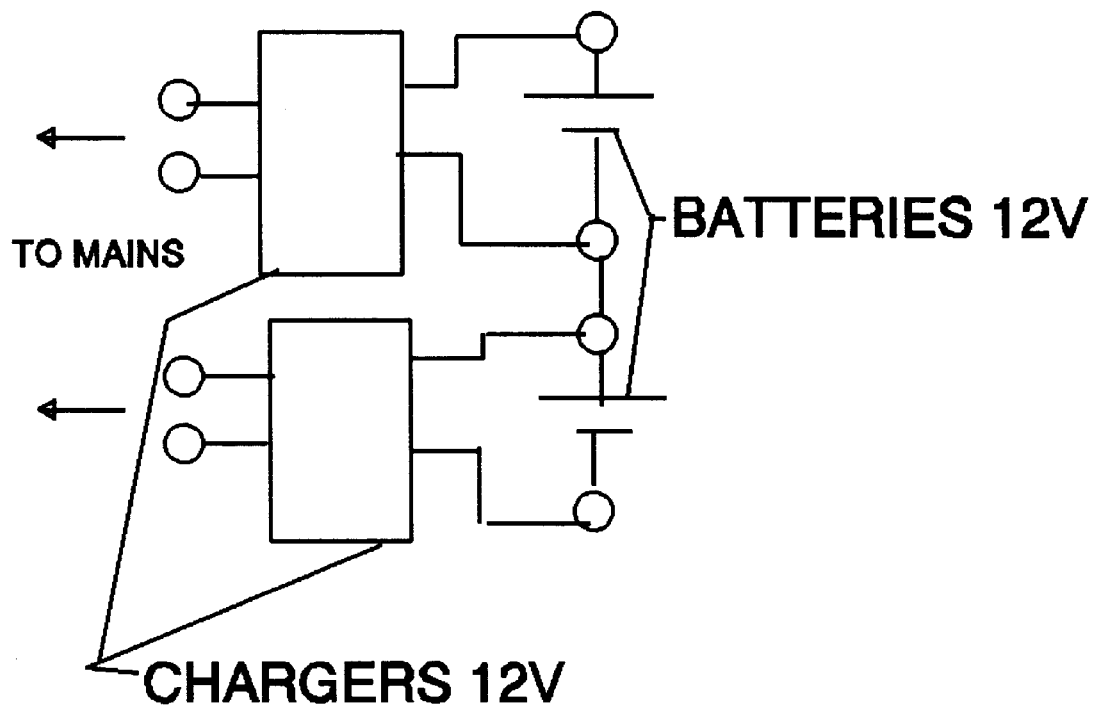
FIG. 19 shows the charging of two batteries by two battery chargers.

FIG. 19 shows the charging of the batteries by chargers which can charge batteries of the same voltage. For example here, both the chargers and the batteries are rated for 12 volts. Similarly, the solar panels can have similar ratings. Since the electric vehicles have batteries in series, one can charge each of the batteries by 12 volt chargers which are normally cheaper than 24 volt chargers, due the mass production of the 12 volt chargers.

I claim:

1. A solar powered electric vehicle comprising a chassis, a single steerable front wheel and two laterally spaced rear drive wheels supporting said chassis, a handle bar for steering said front wheel, rear wheel driving means carried by said chassis including an electric motor and a speed reducer, hydraulic brake means operable on said wheels and controlled from said handle bar, a storage battery connected to said motor, a photovoltaic solar panel mounted on said vehicle and connected to said battery for recharging the latter, a battery charger connected to said battery and adapted to be connected to a public alternating current supply, a heat insulated compartment mounted at the back of said chassis and enclosing said battery charger and said battery, an electric braking circuit in which said motor is connected and including means operable by the vehicle driver to cause electric braking of said vehicle wherein said motor generates a back electromotive force which feeds said battery and/or a heating resistor.

2. A vehicle as defined in claim 1, further including mounting means for said solar panel comprising a vehicle user's enclosing cabin mounted on said chassis and including a roof, said panel mounted on said roof and orientable towards the sun.

3. A vehicle as defined in claim 2, wherein said panel is hinged to said roof about a horizontal axis and along one edge for adjustable inclination and further including link means to maintain said panel at an adjusted inclination.

4. A vehicle as defined in claim 1, further including mounting means for said solar panel comprising a rectangular frame supporting said panel, a pair of posts mounted on said compartment and to which said frame is pivoted about a vertically inclined pivotal axis and first locking means to lock said frame in a selected pivoted position about said inclined pivotal axis.

5. A vehicle as defined in claim 1, wherein said hydraulic brake means includes a master cylinder, brake disks for each wheel and a brake control lever mounted on said handle bar.

6. A vehicle as defined in claim 4, wherein said panel is pivotally supported within said frame about a horizontal pivotal axis normal to said inclined pivotal axis and second locking means to lock said panel in a selected pivotal position about said horizontal pivotal axis.

7. A vehicle as defined in claim 4, wherein said panel consists of two panel sections with a gap there between to provide unobstructed rear view for the vehicle driver.

8. A vehicle as defined in claim 4, further including a stepper motor connected to said battery for stepwise pivoting of said frame about said inclined pivotal axis.

9. A vehicle as defined in claim 8, wherein said stepper motor is reversible and is connected in a circuit including a stepper motor controller, limit switches and a reset switch, said controller and switches operative to rotate said stepper motor in a reverse and forward direction and at a fast speed and at a sun tracking speed in either of said directions.

10. A vehicle as defined in claim 2, further including posts upstanding from said roof, said panel being pivotally supported by said posts for pivotal movement about a substantially horizontal axis transverse to said panel at the mid section thereof and locking means to releasable lock said panel in a selected rotated position about said horizontal axis.

11. A vehicle as defined in claim 3, further including a wind deflector mounted on said roof upstream of said solar panel and shielding the latter against the wind during vehicle travelling.

12. A vehicle as defined in claim 10, further including a wind deflector mounted on said roof upstream of said solar panel and shielding the latter against the wind during vehicle travelling.

13. A vehicle as defined in claim 9, further including a vehicle user's enclosing cabin mounted on said chassis and including a roof, an additional solar panel mounted on said roof about a vertically inclined pivotal axis which is substantially coplanar with the inclined pivotal axis of the compartment mounted solar panel, the pivotal axis of the two panels being interconnected by a universal joint, said stepper motor pivoting both panels in synchronism.

14. A vehicle as defined in claim 13, further including a wind deflector mounted on said roof upstream from the roof mounted solar panel to shield the latter against the wind during vehicle travelling.

15. A vehicle as defined in claim 1, wherein said solar panel is of quadrangular shape and further including sun rays reflectors outwardly protruding from each of the four sides of said panel at an obtuse angle with respect to the latter to reflect the sun rays back onto said panel when the latter is substantially normal to the sunrays.

16. A vehicle as defined in claim 1, wherein each rear wheel includes two adjacent coaxial bicycle wheels.

17. A vehicle as defined in claim 1, wherein said rear wheels are mounted on a rear axle and said speed reducer is a sprocket and chain system directly connected to said motor and to said rear axle, the right rear wheel having a friction fit on said rear axle and wherein the left rear wheel is free from said rear axle upon dynamic braking or plugging of said vehicle by means of said electric braking circuit.

18. A vehicle as defined in claim 1, further including a bench seat for the vehicle user's transversely mounted on said chassis.

19. A vehicle as defined in claim 18, wherein said bench seat is spring mounted.

20. A vehicle as defined in claim 1, further including a speed controller for said motor, operable from said handle bar and including means to vary the rotational speed and the rotation direction of said motor.

21. A vehicle as defined in claim 1 wherein said solar panel is connected to said battery through a charge controller.

22. A vehicle as defined in claim 21, further including a voltmeter connected across said battery and mounted on said handle bar to indicate the charged condition of said battery.

23. A vehicle as defined in claim 1, wherein said electric braking circuit is arranged to cause regenerative braking of said vehicle.

24. A vehicle as defined in claim 1, wherein said circuit is arranged to cause dynamic braking of said vehicle.

25. A vehicle as defined in claim 1, wherein said circuit is arranged to cause vehicle braking by plugging, said circuit including switch means to connect the current generated by the armature winding of said motor directly through a resistor.

26. A vehicle as defined in claim 1, further including a vehicle user's enclosing cabin and a cabin heating means in said cabin connected to said battery.

27. A vehicle as defined in claim 26, wherein said cabin heating means is a resistor.

28. A vehicle as defined in claim 26, wherein said cabin heating means is a heat pump.

29. A vehicle as defined in claim 26, wherein said cabin heating means is a semiconducting thermo-electric element.

30. A vehicle as defined in claim 1, further including a vibration dampening means on which said battery is supported.

\* \* \* \* \*